United States Patent
Kesari

(10) Patent No.: US 12,524,313 B2
(45) Date of Patent: Jan. 13, 2026

(54) STATEFUL APPLICATION PERSISTENCY FOR RECLAIMABLE COMPUTE INSTANCES

(71) Applicant: NetApp, Inc., San Jose, CA (US)

(72) Inventor: Yarden Joshua Kesari, Ashkelon (IL)

(73) Assignee: NetApp, Inc., San Jose, CA (US)

( * ) Notice: Subject to any disclaimer, the term of this patent is extended or adjusted under 35 U.S.C. 154(b) by 3 days.

(21) Appl. No.: 18/637,709

(22) Filed: Apr. 17, 2024

(65) Prior Publication Data
US 2025/0328429 A1  Oct. 23, 2025

(51) Int. Cl.
*G06F 12/00* (2006.01)
*G06F 11/14* (2006.01)

(52) U.S. Cl.
CPC ................ *G06F 11/1461* (2013.01)

(58) Field of Classification Search
CPC ............ G06F 11/1461; G06F 11/1448; G06F 11/1471; G06F 3/061; G06F 3/0616; G06F 3/0649; G06F 3/065; G06F 9/455; G06F 9/4843
See application file for complete search history.

(56) References Cited

U.S. PATENT DOCUMENTS

| | | | |
|---|---|---|---|
| 2002/0059507 A1 | 5/2002 | Hironaka | |
| 2017/0223035 A1* | 8/2017 | Watanabe | H04L 63/1441 |
| 2020/0026580 A1* | 1/2020 | Bahramshahry | G06F 9/5077 |
| 2021/0240459 A1* | 8/2021 | Ranjan | G06F 9/5055 |

* cited by examiner

*Primary Examiner* — Shawn X Gu

(57) ABSTRACT

Disclosed herein are methods and systems for the operation of a resource management service. The resource management service deploys reclaimable compute instances from a resource pool and continuously generates predicted remaining lifespans for the deployed reclaimable compute instances. The predicted remaining lifespan is monitored to determine if the predicted remaining lifespan is below a threshold value. In response to the predicted remaining lifespan for a reclaimable compute instance falling below a threshold value, the resource management service instructs the reclaimable compute instance to create an application state snapshot of an application running thereon. A subsequent compute instance is deployed from the resource pool, on which the application can be restored to a previous state using the application state snapshot.

20 Claims, 11 Drawing Sheets

STATEFUL APPLICATION PERSISTENCY FOR RECLAIMABLE COMPUTE INSTANCES

TECHNICAL FIELD

Aspects of the disclosure are generally related to the field of compute resource management and, more specifically, methods and systems to manage applications on reclaimable compute instances.

BACKGROUND

Compute service providers offer compute instances such as virtual machines and containers in accordance with a variety of models including reserved, on-demand, and reclaimable (sometimes referred to as spot instances). On-demand compute instances are continuously available to users who pay for the on-demand capacity per incremental units of time (seconds, minutes, hours, etc.). Reserved instances, which are a subset of on-demand instances, are made available for a predetermined amount of time, after which customers may lose access to the instances. Reclaimable instances are computing instances of varying availability that may be revoked at any time by the compute service provider.

Reclaimable instances are generally less expensive than on-demand and reserved instances due to their risk of being reclaimed. However, the potential cost savings represented by reclaimable instances are balanced by their variability. Compute service providers deploy reclaimable instances of computing capacity at the request of customers. Customers instantiate applications on the compute instances to run various workloads. However, the compute service providers may recall the reclaimable instances with little notice—in just a matter of minutes or less in some situations-giving customers little time to react.

When a compute instance is reclaimed, an application running on it is terminated. Some solutions can predict such interruptions and proactively shift applications to replacement compute resources. However, while this may work well with respect to stateless applications, such solutions do not suffice for stateless applications. For example, while application data persisted to disk may be backed up, and thus leveraged, application state data in memory is lost when the compute resource is terminated. Problematically, losing application state leads to several significant challenges such as lost data consistency, poor user experiences, failed session management, and reduced fault tolerance.

SUMMARY

Disclosed herein are methods and apparatus for the operation of a resource management service. The resource management service deploys reclaimable compute instances from a resource pool and continuously generates predicted remaining lifespans for the deployed reclaimable compute instances. The predicted remaining lifespan is monitored to determine if the predicted remaining lifespan is below a threshold value. In response to the predicted remaining lifespan for a reclaimable compute instance falling below the threshold, the resource management service instructs the reclaimable compute instance to create an application state snapshot of a stateful application running thereon. A subsequent compute instance is deployed from the resource pool, on which the application can be restored to a previous state using the application state snapshot.

In some implementations, when the predicted remaining lifespan falls below the threshold value, the system may deploy a subsequent compute instance from the resource pool and instantiate the stateful application on the subsequent compute instance using the application state snapshot. In the same or other implementations, the predicted remaining lifespan may be generated using a machine learning model trained to compute the predicted remaining lifespan. Example input to the machine learning model include an instance type of the reclaimable compute instance, and example output includes an indication of the predicted remaining lifespan. Example instance types include a general-purpose type, a compute optimized type, a memory instance type, a storage instance type, an accelerated computing type, and a high-performance computing type. The machine learning model may be trained on training data such as historical reclamation patterns associated with reclaimable compute instances of instance types similar to the instance type of the reclaimable compute instance.

In still the same or other implementations, the application state snapshot may be a snapshot taken of in-memory application state data associated with the stateful application. Example application state data include a current state of the stateful application at a time of the application state snapshot.

This Summary introduces a selection of concepts in a simplified form that are further described below in the Technical Disclosure. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1:
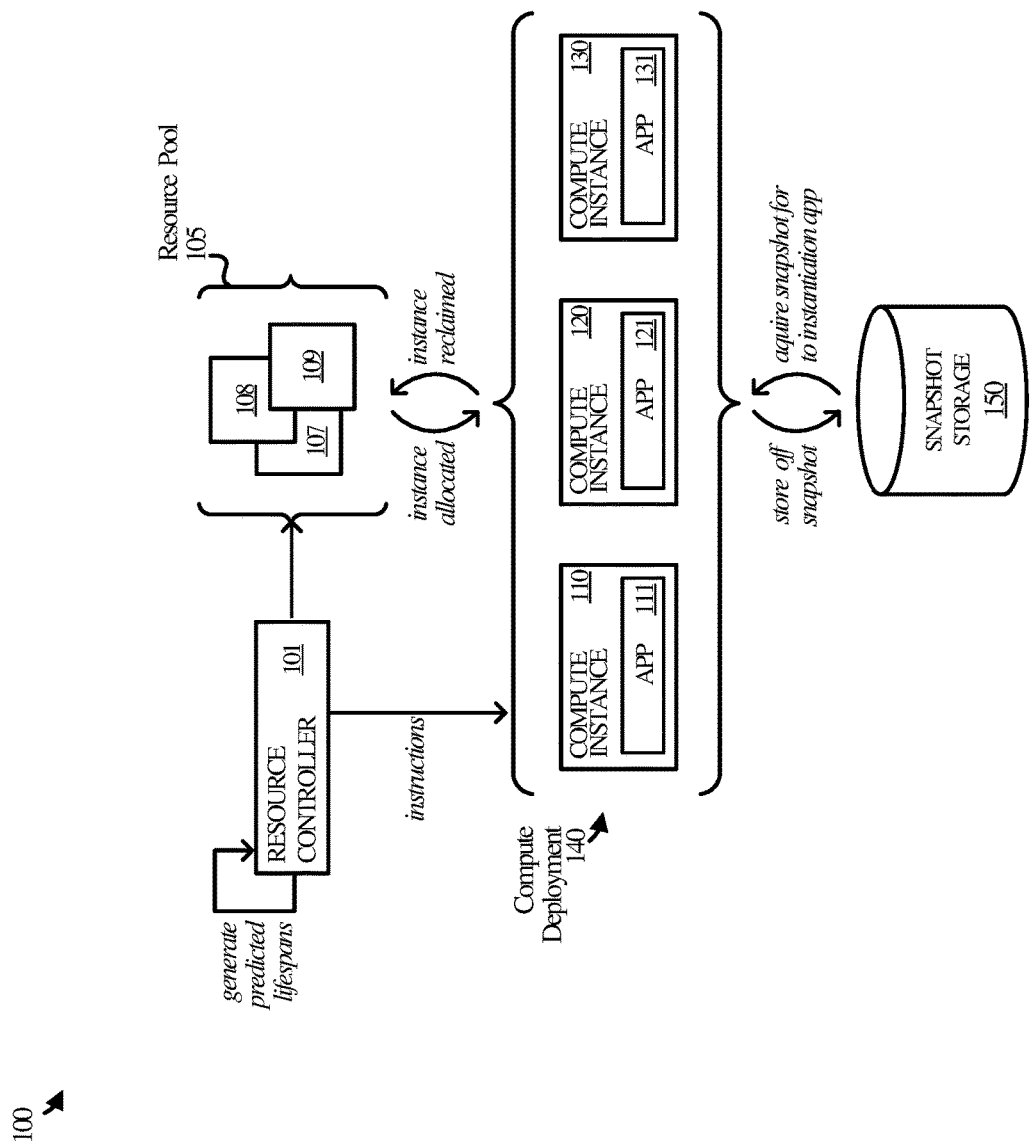
FIG. 1 illustrates a computing environment in an implementation.

Disclosed herein are methods and systems for managing compute resources. The disclosed concepts facilitate an improved resource management process that beneficially mitigates, and potentially eliminates, computational downtime for stateful applications running on reclaimable compute instances. In particular, in-memory snapshot of stateful applications may be taken as their predicted lifespans approach or fall below a threshold lifespan. The snapshots may be stored remotely, thereby facilitating the re-instantiation of the stateful applications on new compute instances (e.g., a new reclaimable instance, an on-demand instance, or the like). In the aggregate, such flexibility allows a resource manager to anticipate compute interruptions and proactively keep stateful applications running.

In various embodiments, a user interacts with an administrative portal of the resource management service to input parameters and configure instances of computing resources. In response to the user requesting computing capacity and—optionally—a desired lifespan (and/or other such criteria), a reclaimable compute instance that meets the criteria is selected or otherwise obtained and deployed from a resource pool. The resource management service generates and monitors a predicted remaining lifespan for the reclaimable compute instance. When the predicted remaining lifespan falls below a threshold value, the resource management service instructs the reclaimable compute instance to create an application state snapshot of a stateful application running on the reclaimable compute instance. The resource management service instructs the reclaimable compute instance to store off the application state snapshot in a location remote to the reclaimable compute instance.

The resource management service may then request deployment of a subsequent compute instance from the resource pool. The resource pool deploys the requested compute instance, on which the stateful application is instantiated. Using the application state snapshot, the resource management service restores the application to the state described in the snapshot. In some embodiments, the application state snapshot is a snapshot taken of in-memory application state data associated with the stateful application. In such examples, the application state data reflects a current state of the application at a time of the application state snapshot.

In some examples, the compute resource management service continuously generates the predicted remaining lifespan by executing a machine learning model to generate the predicted remaining lifespan. In some examples, continuously generating the predicted remaining lifespan is generating the predicted remaining lifespans regularly at predetermined intervals. In some examples, the interval between generations of the predicted remaining lifespan is approximately an order of magnitude smaller than the desired lifespan for the compute instance in question (e.g., minutes vs. hours). The machine learning model may be trained on historical reclaimable compute instance reclamation data and compute instance type data. The machine learning model accepts inputs of instance types and outputs an indication of the predicted remaining lifespan for the reclaimable compute instance type. The type of the reclaimable compute instance may be one of a general-purpose type, a compute optimized type, a memory instance type, a storage instance type, an accelerated computing type, or a high-performance computing type.

In some embodiments, the user enables, via an administrative portal, an application persistency feature for an application running on a reclaimable compute instance via a user interface. In some examples, the monitoring the predicted lifespan occurs in response to determining that the application persistency feature is enabled for the application.

In some embodiments, the reclaimable compute instance comprises a virtual machine deployed in accordance with a reclaimable computing model. In more examples, the subsequent compute instance is another virtual machine deployed in accordance with one of a reclaimable computing model, a reserved computing model, and an on-demand computing model.

Various embodiments of the present technology provide for a wide range of technical effects, advantages, and/or improvements to computing systems and components. For example, various embodiments may include one or more of the following technical effects, advantages, and/or improvements: 1) non-routine and unconventional dynamic implementation of an application persistency process; 2) non-routine and unconventional operations for predicting the reclamation of reclaimable compute instances; and 3) non-routine and unconventional dynamic implementation of a resource manager service.

FIG. 1 illustrates computing environment 100 in an implementation. Computing environment 100 includes resource controller 101, resource pool 105, compute deployment 140, and remote storage 150. Resource pool 105 includes compute instances 107, 108, and 109. Compute deployment 140 includes compute instances 110, 120, and 130. Applications 111, 121, and 131 are instantiated on compute instances 110, 120, and 130, respectively, and are each representative of a stateful application. Computing environment 100 further includes remote storage 150.

Resource controller 101 is representative of any hardware, software, and/or firmware component(s) capable of supporting application persistency as disclosed herein. Resource controller 101 may be employed in the context of a resource management service, a compute service provider, or in any other suitable context. Resource controller 101 employs application persistency process 200, described in more detail below with respect to FIG. 2.

Resource pool 105 is representative of a resource pool having computing resources available to be allocated to compute deployments. Examples of compute instances include virtual machines, containers, and the like. Compute deployment 140 is representative of a collection of compute instances deployed from resource pool 105 in support of a stateful application, service, or the like. For example, compute instances 110, 120, and 130 host applications 111, 121, and 131, respectively. Remote storage 150 is generally representative of a variety of storage structures sufficient to store application state snapshots.

Figure 2:
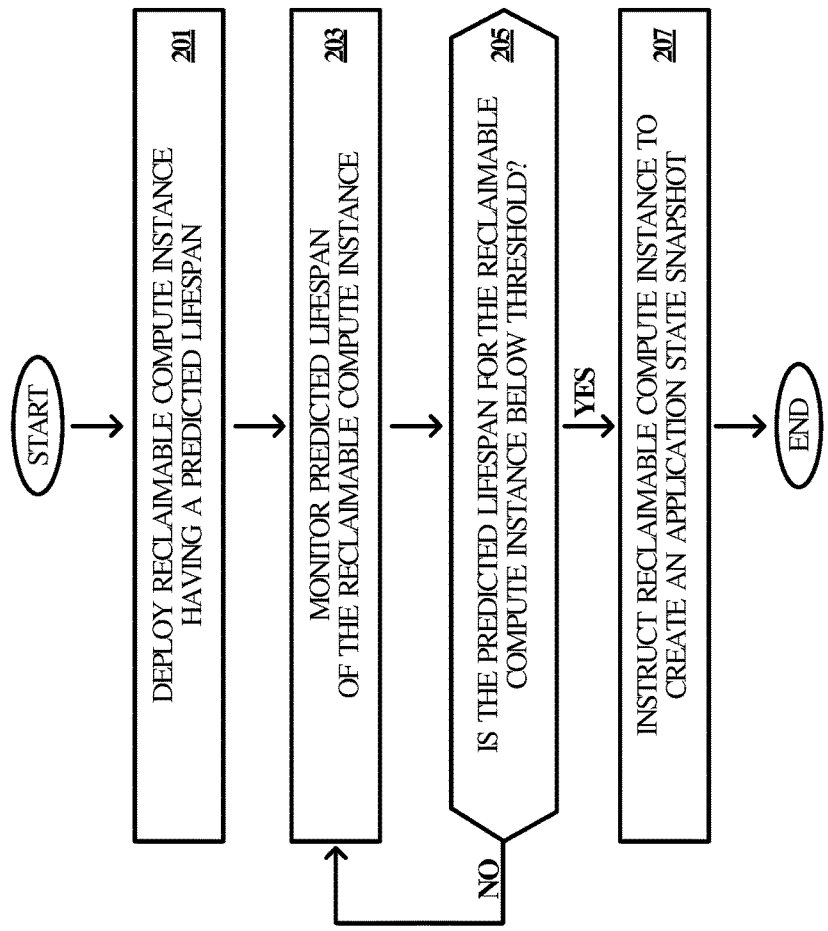
FIG. 2 illustrates an application persistency process in an implementation.

FIG. 2 illustrates application persistency process 200 in an implementation. Application persistency process 200 may be implemented in program instructions in the context of the software and/or firmware elements of resource controller 101. The program instructions, when executed by one or more processing devices of one or more computing systems (e.g., computing device 1001 in FIG. 10), direct the one or more computing systems to operate as follows, referring parenthetically to the steps in FIG. 2, and in the singular to a computing device for the sake of clarity.

To begin, the computing device deploys a reclaimable compute instance from a resource pool (step 201). The reclaimable compute instance has a predicted lifespan that conforms to otherwise meets a desired lifespan specified ahead of time when selecting the resource from the pool. For example, an enterprise may desire to obtain a reclaimable compute instance having a lifespan of weeks, days, hours, or any other suitable timeframe. The predicted lifespan may be predicated based on a number of factors such as a type of the computing instance, capacity constraints, and the like.

Next, the computing device monitors the predicted lifespan for the reclaimable compute resource (step 203). That is, once the resource has been deployed, a predicted lifespan for reclaimable resource of the same type may vary. Thus, the predicted lifespan for the deployed resource may fluctuate up or down depending on spot market conditions for that type of resource. The computing device monitors current conditions and predicts on a continuous, semi-continuous, or other such period basis the current lifespan for such a resource.

At step 205, the computing device evaluates the predicted lifespan against a threshold value to determine whether the predicted lifespan meets, exceeds, or falls below the threshold. The threshold value may be a constant, predetermined value such as a number of hours, a number of minutes, or the like. Alternatively, or in addition, the threshold value may be a time remaining of the original desired lifespan. When the predicted remaining lifespan for a compute instance is above a threshold value, the computing device continues to monitor the compute instance. However, when the predicted lifespan for a compute instance is below the threshold value (or otherwise fails to satisfy lifespan criteria), the computing device triggers the creation of an application state snapshot (step 207).

Triggering the creation of the snapshot may include, for example, instructing an agent, application, or software component on the compute instance to take the snapshot. The compute instance (or element thereof) responsively takes an in-memory snapshot of the application's state and stores the snapshot remotely, meaning on a location other than the compute instance itself. In some cases, the snapshot may be stored remotely with respect to both the compute instance and the host computer on which the compute instance is provisioned. For example, the snapshot may sent to a remote storage service, allowing it to be used shortly thereafter when reconstituting the application on a newly provisioned compute instance.

Figure 3:
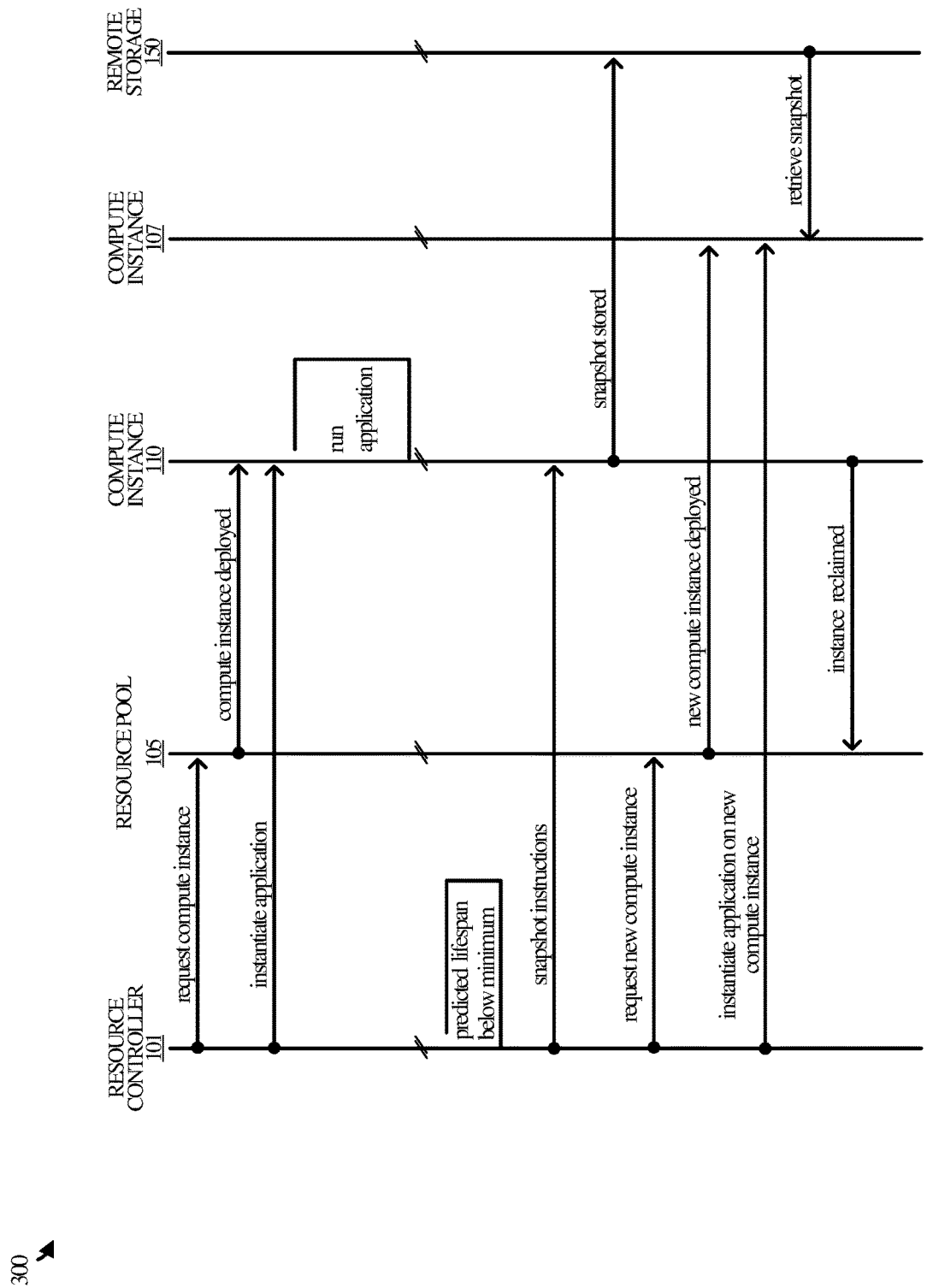
FIG. 3 illustrates an operational sequence in an implementation.

FIG. 3 illustrates an application of process 200 in the context of computing environment 100 in an implementation, represented by sequence 300. To begin, resource controller 101 requests a reclaimable compute instance from resource pool 105. Resource pool 105 deploys the requested reclaimable compute instance via compute instance 110. Compute instance 110 is directed by resource controller 101 to run a stateful application on compute instance 110. Resource controller generates and monitors a remaining lifespan prediction for compute instance 110. Where the remaining lifespan prediction falls below a threshold value, resource controller 101 instructs compute instance 110 to create an in-memory application state snapshot for the application. Compute instance 110 responsively creates the snapshot and stores it remotely.

Once the snapshot process is complete, resource controller 101 may request a new compute instance from resource pool 105. Resource pool 105 provides the requested compute instance via compute instance 107. Resource controller 101 may then direct compute instance 107 to instantiate the application and, using the application state snapshot, restore the application to the state described in the snapshot.

Figure 4:
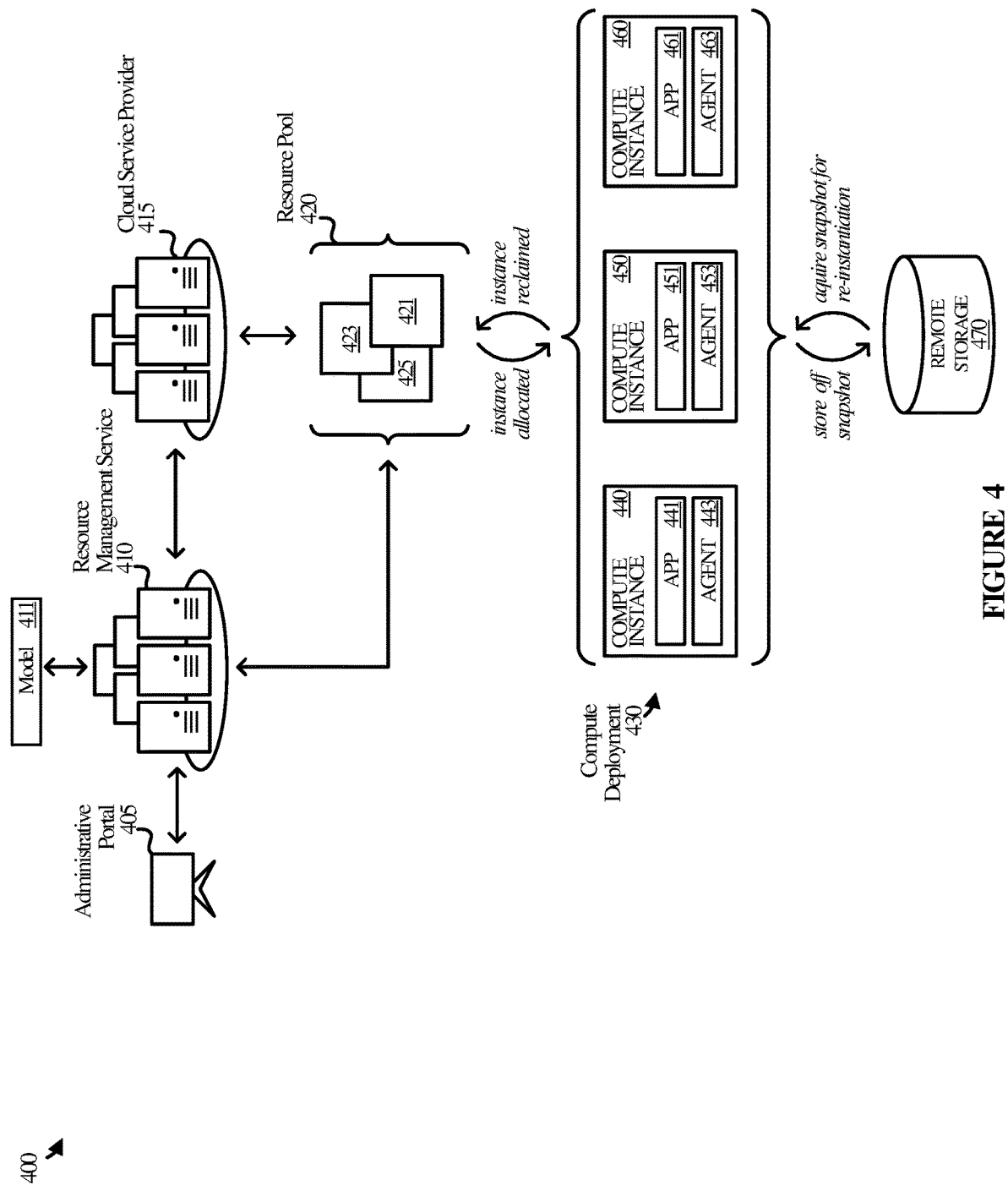
FIG. 4 illustrates another computing environment in an implementation.

FIG. 4 illustrates a compute resource management environment in another implementation, represented by environment 400. Environment 400 includes administrative portal 405, resource management service 410, model 411, compute service provider 415, resource pool 420, compute deployment 430, and remote storage 470. Resource pool 420 includes compute instances 421, 423, and 425. Compute deployment 430 includes compute instances 440, 450, and 460, on which applications 441, 451, and 461, and agents 443, 453, and 463 are hosted, respectively.

Administrative portal 405 is representative an interface in which any person, enterprise, application, or process can engage with resource management service 410 to manage compute resources and configure compute instances. For example, administrative portal 405 could be interacted with by an enterprise administrator configuring compute instances and resource management parameters to facilitate executing the enterprise's data workloads.

Figure 10:
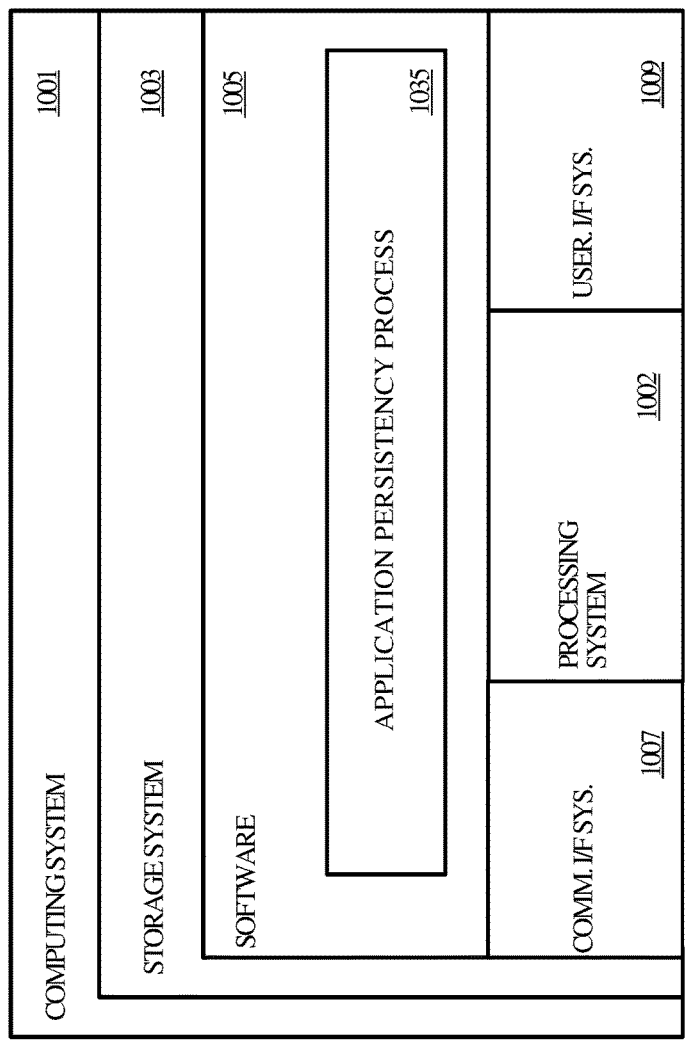
FIG. 10 illustrates a computing system in an implementation.

Resource management service 410 is representative of software that provides compute instance application persistency when employed by a computing device, an example of which is provided by computing system 1001 of FIG. 10. Resource management service 410 may be hosted on local storage or distributed storage and communicates with administrative portal 405 and compute service provider 415 by any number of known communication methods and protocols to configure compute instances and resource management. For example, the enterprise administrator from the previous example may connect to resource management service 410 to enable application persistency and to configure compute instances to create periodic snapshots.

Model 411 is generally representative of an artificial intelligence learning model configured to accept information about compute instance types as an input and to output predicted remaining lifespans for compute instances. Model 411 may be used to continuously generate predicted remaining lifespans for deployed compute instances. Resource management service 410 compares the predicted remaining lifespans to a threshold value to determine where new compute instances should be requested.

Compute service provider 415 is representative of a service provider that offers instances of computing capacity. Resource management service 410 directs compute service provider 415 to deploy compute instances from resource pool 420. Resource pool 420 includes compute instances 421, 423 and 425, each of which are generally representative of instances of compute capacity available for deployment. For example, where resource management service 410 directs compute service provider 415 to make an instance of compute capacity available, compute service provider 415 directs resource pool 420 to deploy one or more of compute instances 421, 423, and 425.

Compute deployment 430 is generally representative of the one or more compute instance that make up the computing capacity allocated to administrative portal 405. Compute deployment 430 includes compute instances 440, 450, and 460. Compute instances 440, 450, and 460 are generally representative of compute instances deployed from resource pool 420. Compute instances 440, 450, and 460 include applications 441, 451, and 461, and agents 443, 453, and 463, respectively. Agents 443, 453, and 463 facilitate the creation of application state snapshots for applications 441, 451, and 461. Where a predicted remaining lifespan below a threshold value is identified for each of compute instances 440, 450 and 460, agents 443, 453, and 463 create application state snapshots for applications 441, 451, and 461, each of which are stored in remote storage 470.

Remote storage 470 is generally representative of a storage structure or service capable of storing application snapshots. For example, where an application state snapshot is created for each of applications 441, 451, and 461, each respective snapshot is stored in remote storage 470. Where any one or more of compute instances 440, 450, or 460 have a predicted remaining lifespan below a threshold value, the resulting snapshots of applications 441, 451, and 461 can be used to instantiate new instance of the stateful applications on newly provisioned compute instances.

Figure 5:
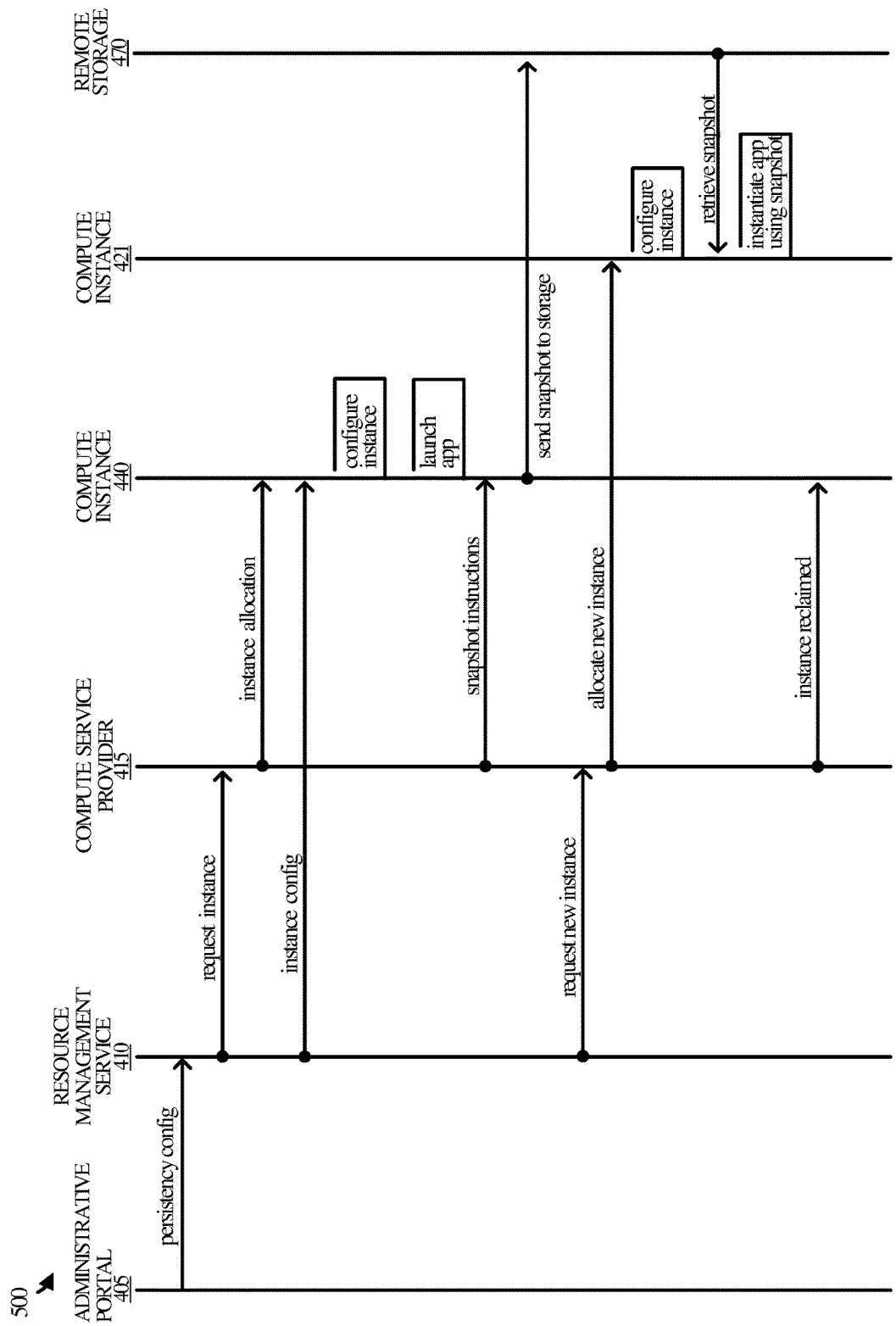
FIG. 5 illustrates an operational sequence in an implementation.

FIG. 5 illustrates an operational sequence of an application of environment 400 in an implementation, represented by sequence 500. Sequence 500 includes user 405, resource management service 410, compute service provider 415, compute instance 440, and compute instance 421, each of which are described in detail in the associated text to FIG. 4.

To begin, administrative portal 405 communicates with resource management service 410 to indicate that the application persistency process should be enabled. Where the application persistency process is desired, administrative portal 405 configures resource management service 410 to enable application persistency. In configuring resource management service 410, administrative portal 405 may also indicate the volume of computing capacity desired for workload execution such as CPU capacity, memory constraints, bandwidth, and the like.

Resource management service 410 receives the configuration and indication of the desired computing capacity volume and generates a request for computing capacity. The request for computing capacity is received at compute service provider 415.

Compute service provider 415 receives the request for compute capacity from resource management service 410 and allocates the requested capacity by deploying compute instance 440. In addition, compute service provider 415 and/or an orchestration service (not shown) instantiates a stateful application on compute resource 440 to execute workloads. The stateful application runs and executes workloads until the predicted remaining lifespan for compute instance 440, as monitored by resource management service 410, falls below a threshold value.

In response to the predicted remaining lifespan for compute instance 440 falling below a threshold value, resource management service 410 instructs agent 443 to create an application state snapshot of application 441. Agent 443, running on compute instance 440, creates the application state snapshot and sends it to remote storage 470.

Either shortly before or shortly after compute instance 440 has been reclaimed, resource management service 410 requests a new compute instance to replace compute instance 440. Compute service provider 415 receives the request for a new compute instance and deploys new compute capacity via compute instance 421. Resource management service 410 configures compute instance 421 according to the preferences configured in administrative portal 405, acquires the application state snapshot from remote storage 470, and freshly instantiates the application on compute instance 421 using the snapshot. Using the application state snapshot, compute instance 421 restores the application to the state contained in the state data of the application state snapshot and continues to execute workloads.

Figure 6:
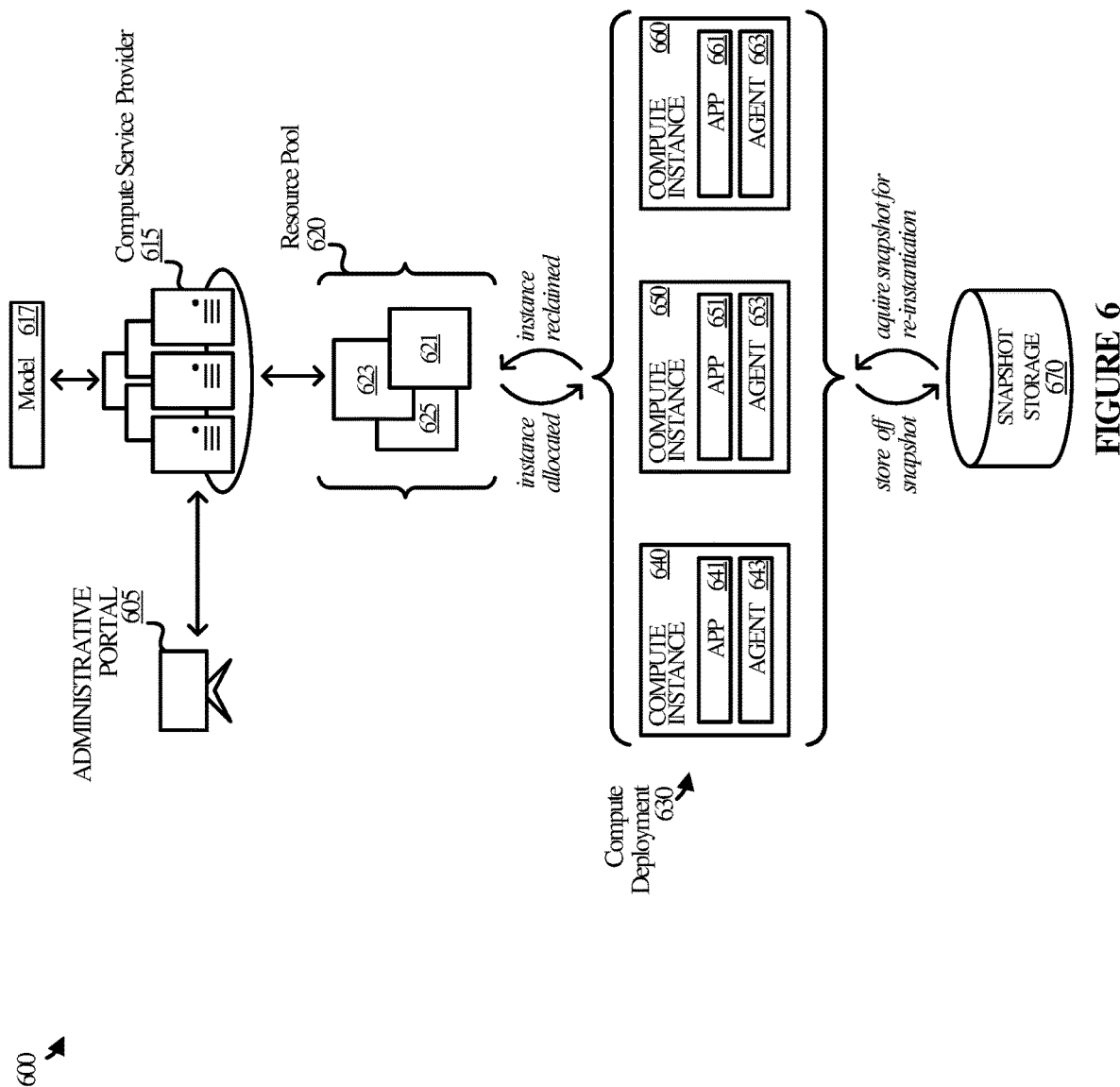
FIG. 6 illustrates another computing environment in an implementation.

FIG. 6 illustrates an alternative compute resource management environment in an implementation, represented by environment 600. Environment 600 includes administrative portal 605, compute service provider 615, model 617, resource pool 620, compute deployment 630, and remote storage 670. Resource pool 620 includes compute instances 621, 623, and 625. Compute deployment 630 includes compute instances 640, 650, and 660, on which applications 641, 651, and 661, and agents 643, 653, and 663 are hosted, respectively.

Administrative portal 605 is representative of an interface in which any person, enterprise, application, or process can engage with resource management service 410 to manage compute resources and configure compute instances. For example, administrative portal 605 could be interacted with by an enterprise administrator configuring compute instances and resource management parameters to facilitate executing the enterprise's data workloads.

Compute service provider 615 is representative of a service provider that offers instances of computing capacity and the application persistency process. Compute service provider 615 deploys compute instances from resource pool 620. Resource pool 620 includes compute instances 621, 623 and 625, each of which are generally representative of instances of compute capacity available for deployment. For example, where administrative portal 605 directs compute service provider 615 to make an instance of compute capacity available, compute service provider 615 directs resource pool 620 to deploy one or more of compute instances 621, 623, and 625.

Model 617 is generally representative of an artificial intelligence learning model configured to accept information about compute instance types as an input and to output predicted remaining lifespans for compute instances. Where enabled, model 617 may continuously generate predicted remaining lifespans for deployed compute instances. Compute service provider 615 compares the predicted remaining lifespans to a threshold value to determine where new compute instances should be requested.

Compute deployment 630 is generally representative of the one or more compute instance that make up the computing capacity allocated to administrative portal 605. Compute deployment 630 includes compute instances 640, 650, and 660. Compute instances 640, 650, and 660 are generally representative of compute instances deployed from resource pool 620. Compute instances 640, 650, and 660 include applications 641, 651, and 661, and agents 643, 653, and 663, respectively. Agents 643, 653, and 663 facilitate the creation of application state snapshots for applications 641, 651, and 661. When a predicted remaining lifespan below a threshold value is identified for each of compute instances 640, 650 and 660, agents 643, 653, and 663 create application state snapshots for applications 641, 651, and 661, each of which are stored in remote storage 670.

Remote storage 670 is generally representative of a storage service capable of storing application snapshots. For example, where application state snapshots are created for each of applications 641, 651, and 661, each respective snapshot is stored in remote storage 670. Where any one or more of compute instances 640, 650, or 660 have a predicted remaining lifespan below a threshold value, the resulting snapshots of applications 641, 651, and 661 can be each respectively be used to instantiate the terminated applications and restore previous states for each.

Figure 7:
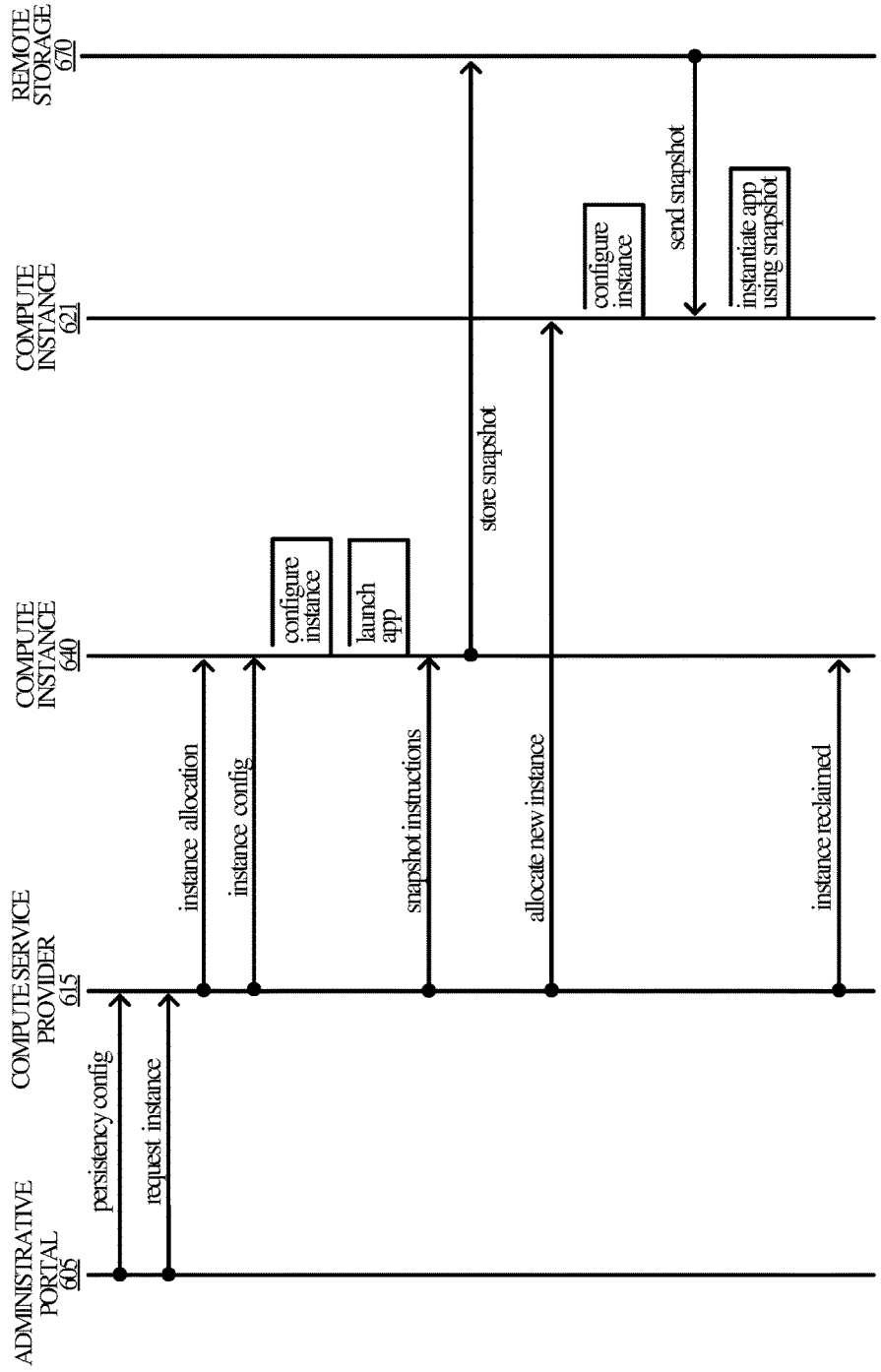
FIG. 7 illustrates another operational sequence in an implementation.

FIG. 7 illustrates an operational sequence of an application of environment 600 in an implementation, represented by sequence 700. Sequence 700 includes administrative portal 605, compute service provider 615, compute instance 640, and compute instance 621, and remote storage 670, each of which are described in detail in the associated text to FIG. 6.

To begin, administrative portal 605 communicates with compute service provider 615 to indicate whether the application persistency process should be enabled. Where the application persistency process is desired, administrative portal 605 configures compute service provider 615 to enable application persistency. In configuring compute service provider 615, administrative portal 605 also indicates the volume of computing capacity desired for workload execution, desired CPU capacity, memory requirements, and the like.

Compute service provider 615 receives the request for compute capacity from administrative portal 605 and allocates the requested capacity by deploying compute instance 640. Compute service provider 615 and/or an orchestration service configures compute instance 640 to instantiate application 641 to execute workloads. Application 641 runs and executes workloads until the predicted remaining lifespan for compute instance 640 is below a threshold value.

In response to the predicted remaining lifespan for compute instance 640 falling below a threshold value, compute service provider 615 instructs agent 643 on compute instance 640 to create an application state snapshot of application 641. Agent 643 creates the application state snapshot and sends it to remote storage 670.

Application 641 running on compute instance 640 is terminated when compute instance 640 is reclaimed. However, compute service provider 615 deploys a new compute instance via compute instance 621 to replace the reclaimed compute instance. Compute service provider 615 configures compute instance 621 according to the preferences of administrative portal 605, acquires the application state snapshot for application 641 from remote storage 670, and freshly instantiates the application on compute instance 621. Using the application state snapshot, compute instance 621 restores the application to the state contained in the state data of the application state snapshot and continues to execute workloads. Reclamation of the original instance may occur at any point after the snapshot is created.

Figure 8:
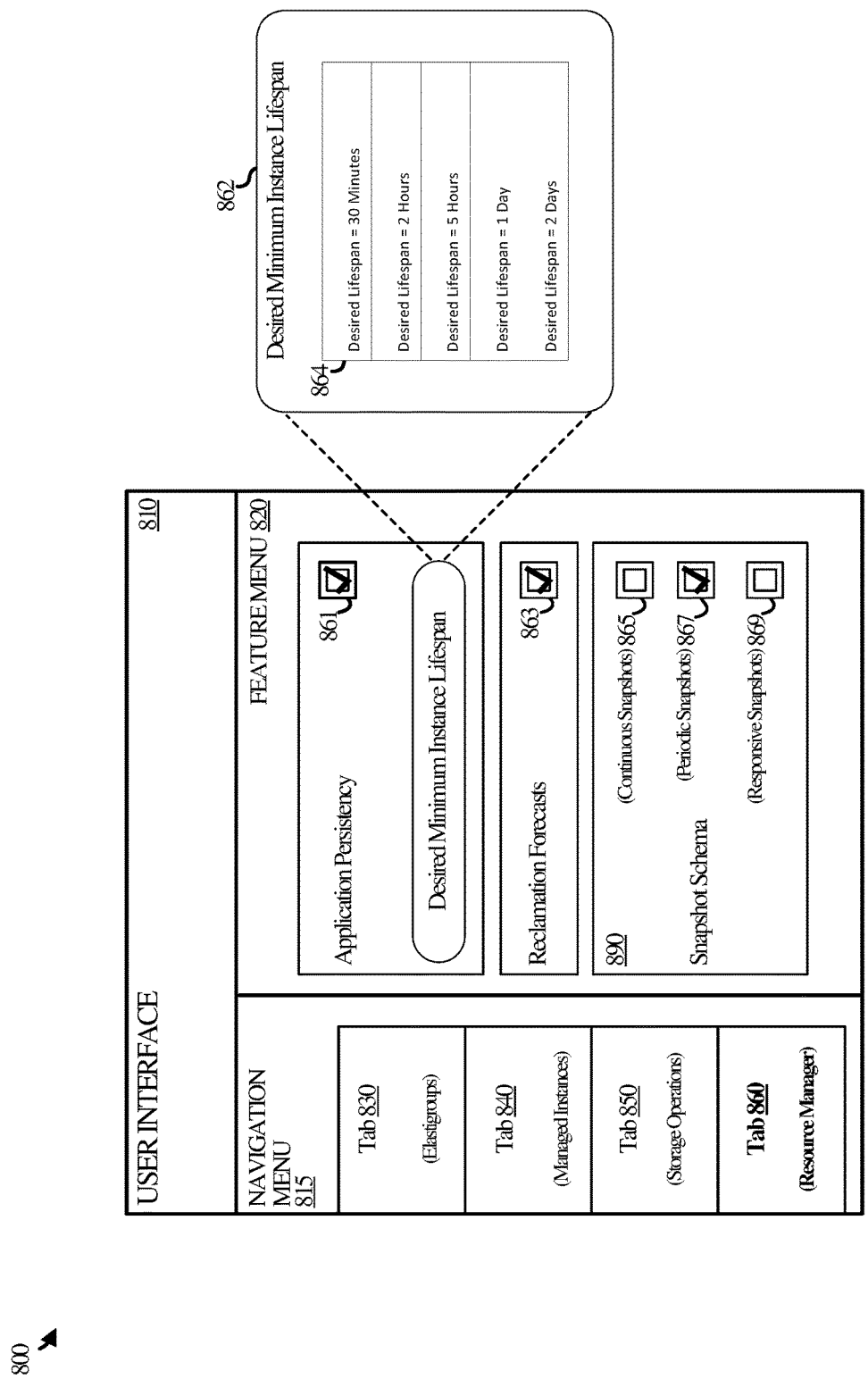
FIG. 8 illustrates a user interface in an implementation.

FIG. 8 illustrates interface 800 in an implementation. Interface 800 includes user interface 810, navigation menu 815, and feature menu 820. Navigation menu 815 further includes tabs 830, 840, 850, and 860. Feature menu 820 further includes components 861, 863, and 890. Component 861 further includes component 862. Component 890 further includes components 865, 867, and 869.

User interface 810 is generally representative of a user interface for a resource management service, such as resource management service 410 of FIG. 4, for example. In another example, user interface 810 may be an interface of a compute service provider, such as compute service provider 615 of FIG. 6.

Navigation menu 815 is generally representative of a menu with selectable elements configured to facilitate navigation of the content contained in user interface 810. Navigation menu 815 includes tabs 830, 840, 850, and 860. Tabs 830, 840, 850, and 860 are generally representative of individual selectable elements that, when selected, are configured to populate feature menu 820 with a group of features and configurations. Tab 830, when selected, renders features and configurations in feature menu 820 that are associated with Elastigroups. Tab 840, when selected, renders features and configurations in feature menu 820 that are associated with managed instances. Tab 850, when selected, renders features and configurations in feature menu 820 that are associated with storage operations. Tab 860, when selected, renders features and configurations in feature menu 820 that are associated with a resource manager.

Feature menu 820 is generally representative of a user interface canvas space where interactable items relevant to the selected tab of navigation menu 815 are rendered and can be selected or configured. Feature menu 820 includes components 861, 863, and 890. Components 861 and 863 are generally representative of checkboxes, that when checked, set a particular setting to a particular configuration. Component 861 is associated with application persistency and, when checked, enables an application persistency feature. Component 862 is generally representative of an input field for a desire minimum instance lifespan parameter for the application persistency feature. The desired minimum instance lifespan parameters informs the threshold value and predicted remaining lifespan comparison performed in the application persistency feature. Component 862 further includes list 864. List 864 contains a number of discrete selections for a desired minimum instance lifespan. Where a user desires a reclaimable compute instance that has a minimum lifespan of two hours, "desired lifespan=2 Hours" is selected, and the application persistency feature is configured with the two-hour minimum instance lifespan parameter.

Component 863 is associated with reclamation forecasts and, when checked, enables a reclamation forecasts feature. Component 890 represents a subset of configurations relating to a particular feature. Component 890 is associated with, and contains a subset of configurations for, a snapshot schema feature. Component 890 includes components 865, 867, and 869.

Components 865, 867, and 869 are generally representative of checkboxes, that when checked, set a particular setting to a particular configuration. Component 865 is associated with a continuous snapshot creation schema and, when checked, enables snapshot creation, and configures the continuous creation of snapshots. Component 867 is associated with a periodic snapshot creation schema and, when checked, enables snapshot creation, and configures the periodic creation of snapshots. Component 869 is associated with a responsive snapshot creation schema and, when checked, enables snapshot creation, and configures the responsive creation of snapshots.

User interface 810 is generally representative of a user interface for a resource management service (e.g., resource management service 410) or a compute service provider (e.g., compute service provider 415). A user accesses user interface 810 to enable and configure a variety of processes, settings, parameters, and the like with regard to a computing environment. User interface 810 includes navigation menu 815 and feature menu 820. Navigation menu 815 facilitates navigation through the content of the user interface, while feature menu 820 is a location where interactable elements representing features and configurations are rendered. A user selects a tab from navigation menu 815, such as resource manager tab 860, and feature menu 820 populates with elements representing features and configurations associated with resource management. Other tabs can be selected from navigation menu 815, causing feature menu 820 to populate with interactable elements representing the respective features and configurations for each tab. In addition to tab 860, navigation menu 815 includes tab 830 associated with Elastigroups, tab 840 associated with managed instances, and tab 850 associated with storage operations.

A user selects tab 860 from the navigation menu and feature menu 820 populates with a number of interactable elements associated with resource management. To enable application persistency, a user checks component 861 associated with the application persistency feature. Similarly, a user enables reclamation forecasts by checking a box associated with the reclamation forecast feature. Another feature, component 890, contains three has three selectable configurations for snapshot schema. When selected, each of the three configurations enables snapshot creation in different schemas based on which configuration was chosen. Where the user selects component 865 associated with a continuous snapshot schema, snapshot creation is enabled and configured to be continuous. Where a user selects component 867 associated with a periodic snapshot schema, snapshot creation is enabled and configured to be periodic. Where a user selects component 869 associated with a responsive snapshot schema, snapshot creation is enabled and configured to be responsive. Responsive snapshot schemas are created in response to an interruption notice but may also be configured to be responsive to other indications or events, such as a reclamation forecast.

In an example, a user wishes to enable application persistency and periodic snapshots. To achieve this, the user launches user interface 810 and selects tab 860, the tab associated with resource management. In response to the selection, feature menu 820 populates with configurations and features associated with resource management. The user selects components 861 and 867, thereby enabling application persistency and periodic snapshot features for applications on reclaimable compute instances.

Figure 9A:
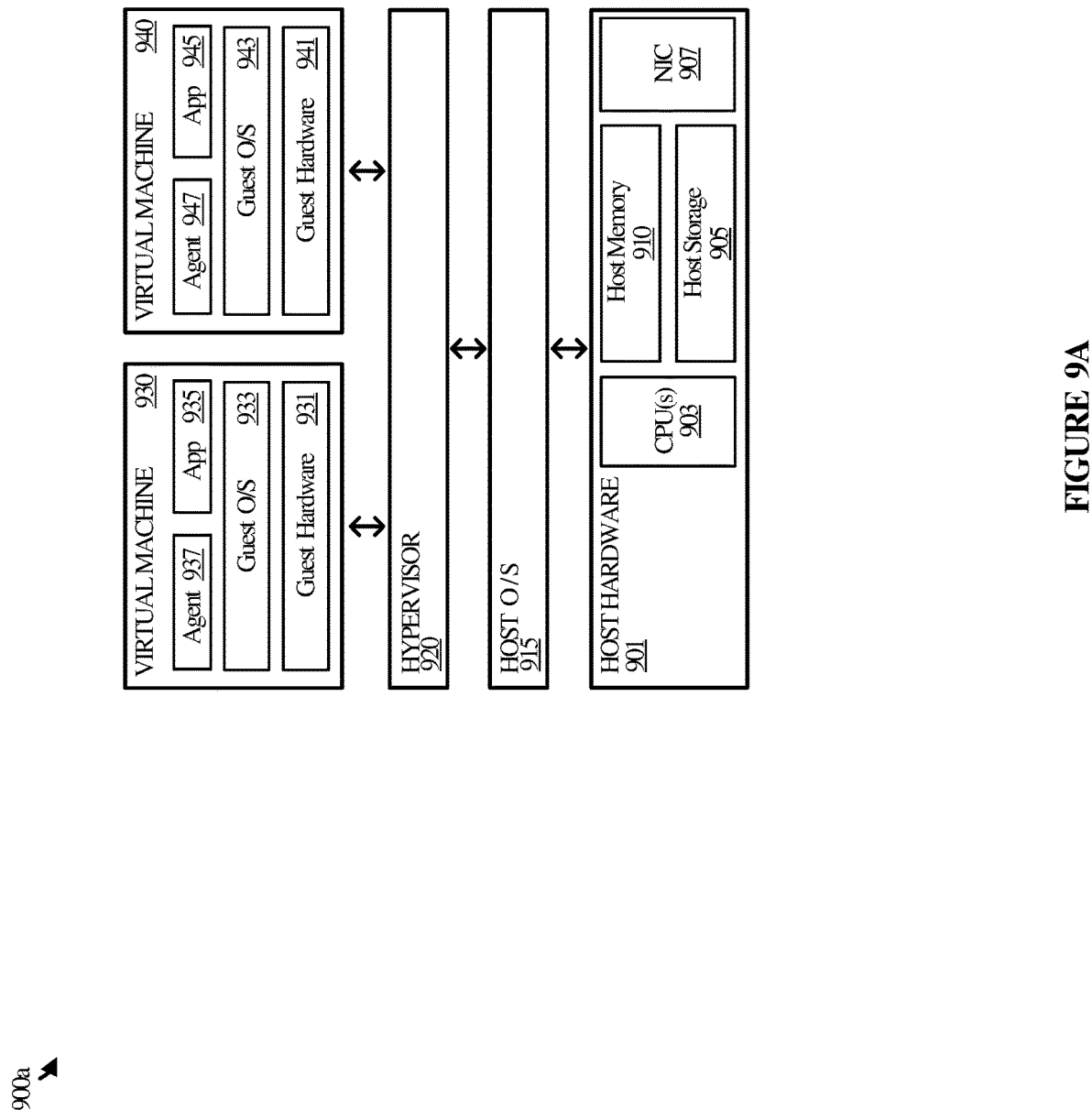
FIG. 9A illustrates a computing architecture in an implementation.

FIG. 9A illustrates computing architecture 900a of a computing environment in an implementation. Computing architecture 900a is capable of hosting a number of virtual machines, represented by virtual machine 930 and virtual machine 940, respectively. While two virtual machines are pictured, computing architecture 900a may host one, two, or many virtual machines. Architecture 900a further includes hypervisor 920, host O/S 915, and host hardware 901. Virtual machine 930 includes agent 937, application 935, guest O/S 933, and guest hardware 931. Virtual machine 940 includes agent 947, application 945, guest O/S 943, and guest hardware 941.

Host hardware 901 further includes one or more central processing units represented by CPU(s) 903, host storage 905, a network interface controller represented by network interface card (NIC) 907, and host memory 910.

Portions of host memory 910 are allocated to each of virtual machine 930 and 940 and their respective virtual subcomponents, processes, and data. Applications 935 and 945 run on the virtual hardware of virtual machines 930 and 940, represented by guest hardware 931 and guest hardware 941, respectively. Application data from applications 935 and 945 can be persisted from virtual memory to a virtual disk, which in turn persists to host storage 905.

Figure 9B:
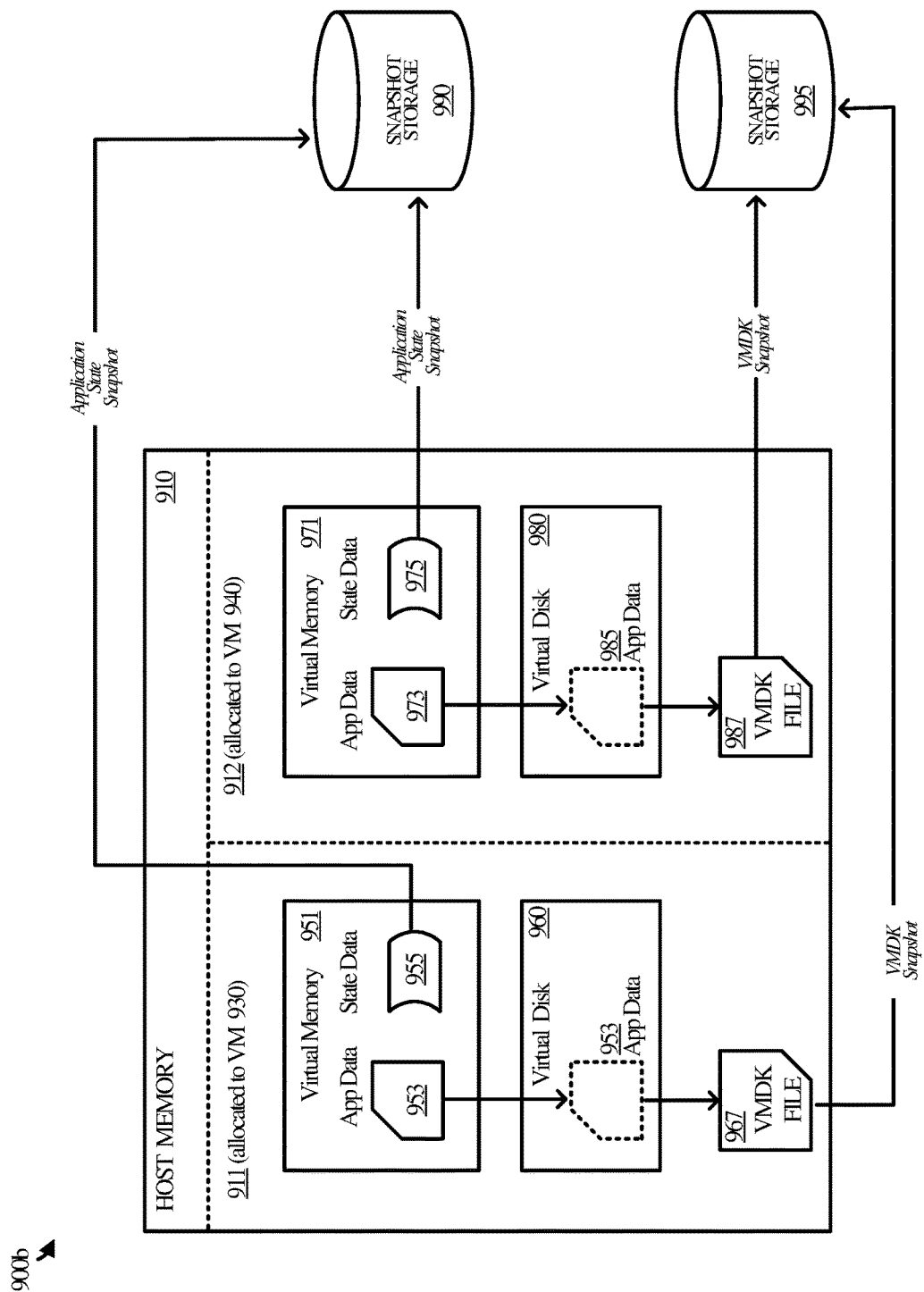
FIG. 9B illustrates a memory architecture in an implementation.

FIG. 9B illustrates operational architecture 900b of a computing environment in an implementation. Operational architecture 900b includes host memory 910, remote storage 990, and remote storage 995. Host memory 910 of FIG. 9B is the same as host memory 910 of FIG. 9A but shown in further detail. Remote storage 990 and 995 are generally representative of storage services capable of storing snapshots. Portions of host memory 910 are allocated to hosting virtual machines.

Memory 910 holds elements associated with virtual machine 930 and virtual machine 940. A first portion 911 of memory 910 includes elements associated with virtual machine 930, including virtual memory 951, virtual disk 960, and VMDK file 967. Virtual memory 951 stores application data 953 and application state data 955. Virtual disk 960 is a memory region to which application data 953 may be persisted. Application data 953 may ultimately be written to VMDK file 967. However, application state data 955 generally is not persisted to virtual disk 960 and/or VMDK file 967, although it may be in some situations.

A second portion 912 of memory 910 includes elements associated with virtual machine 940, including virtual memory 971, virtual disk 980, and VMDK file 987. Virtual memory 971 stores application data 973 and application state data 975. Virtual disk 980 is a memory region to which application data 973 may be persisted. Application data 973 may ultimately be written to VMDK file 987. However, application state data 975 generally is not persisted to virtual disk 980 and/or VMDK file 987, although it may be in some situations.

In operation, application 935 executing on virtual machine 930 may be backed up by at least two mechanisms: a) a periodic backup (or snapshot) of VMDK file 967 to snapshot storage 995, as well as b) a backup of application state to snapshot storage 990. The backup (or snapshot) of in-memory application state for application 935 may be created or otherwise managed by agent 937. The application state snapshot of application 935 deposited to snapshot storage 990 may be used to re-instantiate application 935 on a new virtual machine, per the processes, operational sequences, and scenarios described above with respect to the preceding Figures.

Similarly, application 945 executing on virtual machine 940 may be backed up by at least two mechanisms: a) a periodic backup (or snapshot) of VMDK file 987 to snapshot storage 995, as well as b) a backup of application state to snapshot storage 990. The backup (or snapshot) of in-memory application state for application 945 may be created or otherwise managed by agent 947. The application state snapshot of application 945 deposited to snapshot storage 990 may be used to re-instantiate application 945 on a new virtual machine per the processes, operational sequences, and scenarios described above with respect to the preceding Figures.

FIG. 10 illustrates computing system 1001, which is representative of any system or collection of systems in which the various applications, processes, services, and scenarios disclosed herein may be implemented. Examples of computing system 1001 include, but are not limited to server computers, web servers, cloud computing platforms, and data center equipment, as well as any other type of physical or virtual server machine, container, and any variation or combination thereof. (In some examples, computing system 1001 may also be representative of desktop and laptop computers, tablet computers, and the like.)

Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1009. Processing system 1002 is operatively coupled with storage system 1003, communication interface system 1007, and user interface system 1009.

Processing system 1002 loads and executes software 1005 from storage system 1003. Software 1005 includes and implements application persistency process 1006, which is representative of the processes discussed with respect to the preceding Figures, such as request application persistency process 200. When executed by processing system 1002, software 1005 directs processing system 1002 to operate as described herein for at least the various processes, operational scenarios, and sequences discussed in the foregoing implementations. Computing system 1001 may optionally include additional devices, features, or functionality not discussed for purposes of brevity.

Referring still to FIG. 10, processing system 1002 may include a micro-processor and other circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, microcontroller units, graphical processing units, application specific processors, integrated circuits, application specific integrated circuits, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including request process 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing application persistency processes and procedures as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005, when loaded into processing system 1002 and executed, transforms a suitable apparatus, system, or device (of which computing system 1001 is representative) overall from a general-purpose computing system into a special-purpose computing system customized to support compute instance management as described herein. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of managing compute resources, the method comprising:
on one or more computing devices:
deploying a reclaimable compute instance from a resource pool, wherein the reclaimable compute instance has a predicted remaining lifespan;
monitoring for when the predicted remaining lifespan falls below a threshold remaining lifespan;
in response to the predicted remaining lifespan falling below the threshold remaining lifespan, instructing the reclaimable compute instance to create an application state snapshot of an application running on the reclaimable compute instance; and
storing the application state snapshot remotely with respect to the reclaimable compute instance.

2. The method of claim 1 further comprising executing a machine learning model to continuously generate the predicted remaining lifespan;
wherein the machine learning model accepts input comprising an instance type of the reclaimable compute instance and produces output comprising an indication of the predicted remaining lifespan; and
wherein the instance type is one of a set of instance types, the set of instance types comprising a general-purpose type, a compute optimized type, a memory instance type, a storage instance type, an accelerated computing type, and a high-performance computing type.

3. The method of claim 2, the method further comprising:
training the machine learning model on training data comprising historical reclamation patterns associated with the set of instance types.

4. The method of claim 1, wherein:
the application state snapshot comprises a snapshot taken of in-memory application state data associated with the application; and
wherein the application state data reflects a current state of the application at a time of the application state snapshot.

5. The method of claim 4, the method further comprising:
receiving, via a user interface, a selection of an option to enable an application persistency feature for the application running on the reclaimable compute instance;
wherein monitoring the predicted lifespan occurs in response to determining that application persistency feature is enabled for the application.

6. The method of claim 1, the method further comprising:
deploying a subsequent compute instance from the resource pool; and
instantiating the application on the subsequent compute instance using the application state snapshot.

7. The method of claim 6, wherein:
the reclaimable compute instance comprises a virtual machine deployed in accordance with a reclaimable computing model; and
wherein the subsequent compute instance comprises another virtual machine deployed in accordance with one of a reclaimable computing model, a reserved computing model, and an on-demand computing model.

8. A computing apparatus comprising:
one or more computer readable storage media;
one or more processors operatively coupled with the one or more computer readable storage media; and
program instructions stored on the one or more computer readable storage media for managing compute resources, wherein the program instructions, when executed by the one or more processors, direct the computing apparatus to at least:
deploy a reclaimable compute instance from a resource pool, wherein the reclaimable compute instance has a predicted remaining lifespan;
monitor for when the predicted remaining lifespan falls below a threshold remaining lifespan;
in response to the predicted remaining lifespan falling below the threshold remaining lifespan, instruct the reclaimable compute instance to create an application state snapshot of a stateful application running on the reclaimable compute instance; and
store the application state snapshot remotely with respect to the reclaimable compute instance.

9. The computing apparatus of claim 8, wherein the program instructions direct the computing apparatus to:
execute a machine learning model to generate the predicted remaining lifespan;
wherein the machine learning model accepts input comprising an instance type of the reclaimable compute instance and produces output comprising an indication of the predicted remaining lifespan; and
wherein the instance type is one of a set of instance types, the set of instance types comprising a general-purpose type, a compute optimized type, a memory instance type, a storage instance type, an accelerated computing type, or a high-performance computing type.

10. The computing apparatus of claim 9, wherein the machine learning model is trained on data comprising historical reclamation patterns associated with reclaimable compute instances of instance types similar to the instance type of the reclaimable compute instance.

11. The computing apparatus of claim 8, wherein the application state snapshot comprises a snapshot taken of in-memory application state data associated with the stateful application, and wherein the application state data reflects a current state of the stateful application at a time of the application state snapshot.

12. The computing apparatus of claim 8, wherein the program instructions further direct the computing apparatus to:
receive, via a user interface, a selection of an option to enable an application persistency feature for the stateful application running on the reclaimable compute instance; and
monitor the predicted lifespan in response to determining that application persistency feature is enabled for the stateful application.

13. The computing apparatus of claim 8, wherein the program instructions further direct the computing apparatus to:
deploy a subsequent compute instance from the resource pool; and
instantiate the stateful application on the subsequent compute instance using the application state snapshot.

14. The computing apparatus of claim 13, wherein the reclaimable compute instance comprises a virtual machine deployed in accordance with a reclaimable computing model; and wherein the subsequent compute instance comprises another virtual machine deployed in accordance with one of a reclaimable computing model, a reserved computing model, and an on-demand computing model.

15. One or more computer readable storage media having program instructions stored thereon that, when executed by one or more processors of a computing device, direct the computing device to at least:

deploy a reclaimable compute instance from a resource pool;
continuously generate a predicted remaining lifespan of the reclaimable compute instance;
monitor for when the predicted remaining lifespan falls below a minimum remaining lifespan;
in response to the predicted remaining lifespan falling below the minimum remaining lifespan, instruct the reclaimable compute instance to create an application state snapshot of a stateful application running on the reclaimable compute instance; and
store the application state snapshot remotely with respect to the reclaimable compute instance.

16. The one or more computer readable storage media of claim 15, wherein the program instructions further direct the computing device, in response to the predicted remaining lifespan falling below a threshold value, to:
   deploy a subsequent compute instance from the resource pool; and
   instantiate the stateful application on the subsequent compute instance using the application state snapshot.

17. The one or more computer readable storage media of claim 16, wherein the program instructions further direct the computing device to:
   generate the predicted remaining lifespan comprising executing a machine learning model to continuously generate the predicted remaining lifespan;
   wherein the machine learning model accepts input comprising an instance type of the reclaimable compute instance and produces output comprising an indication of the predicted remaining lifespan; and
   wherein the instance type is one of a set of instance types, the set of instance types comprising a general-purpose type, a compute optimized type, a memory instance type, a storage instance type, an accelerated computing type, or a high-performance computing type.

18. The one or more computer readable storage media of claim 17, wherein the program instructions further direct the computing device to:
   train the machine learning model on training data comprising historical reclamation patterns associated with reclaimable compute instances of instance types similar to the instance type of the reclaimable compute instance.

19. The one or more computer readable storage media of claim 18, wherein:
   the application state snapshot comprises a snapshot taken of in-memory application state data associated with the stateful application; and
   wherein the application state data reflects a current state of the stateful application at a time of the application state snapshot.

20. The one or more computer readable storage media of claim 19, wherein the program instructions further direct the computing device to:
   receive, via a user interface, a selection of an option to enable an application persistency feature for the stateful application running on the reclaimable compute instance;
   wherein the program instructions direct the computing device to monitor for when the predicted remaining lifespan falls below the minimum remaining lifespan in response to the application persistency feature being enabled for the stateful application.

* * * * *